Oct. 25, 1927.
F. HUMPHRIS
1,647,045
RELIEF MECHANISM
Filed Nov. 8, 1926
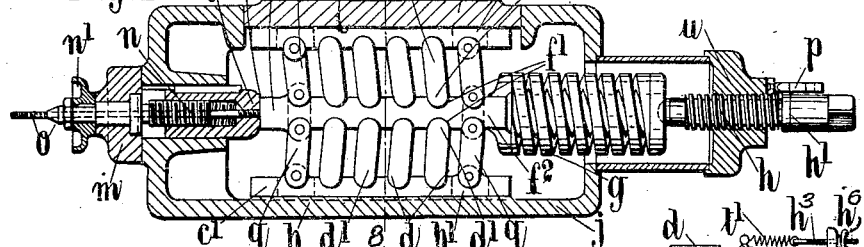
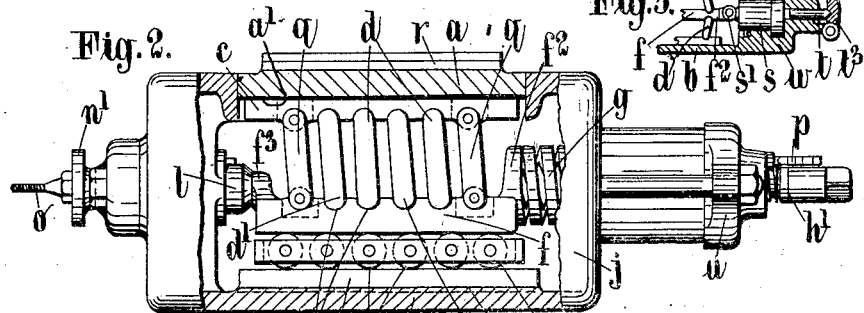
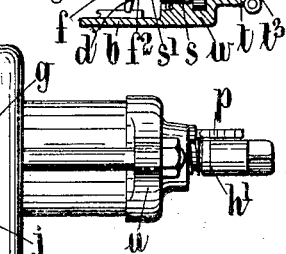
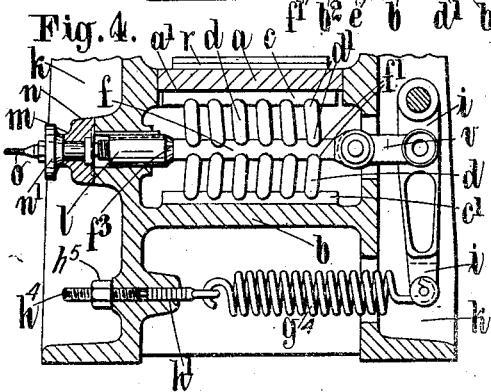
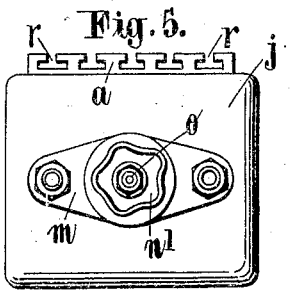
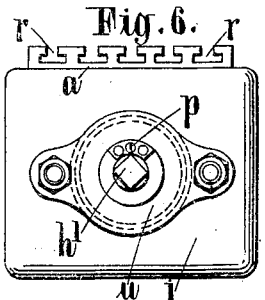
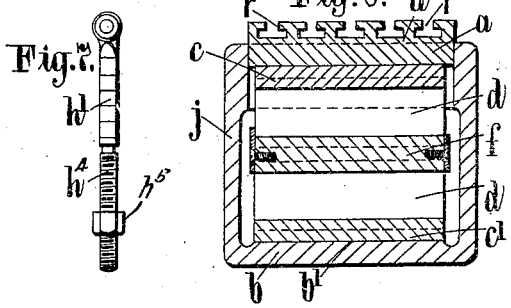
INVENTOR
Frank Humphris
BY
ATTORNEY Patented Oct. 25, 1927.

1,647,045

UNITED STATES PATENT OFFICE.

FRANK HUMPHRIS, OF PARKSTONE, ENGLAND.

RELIEF MECHANISM.

Application filed November 8, 1926, Serial No. 147,150, and in Great Britain October 21, 1925.

This invention consists of improvements in and. relating to relief-mechanism for use in pressing, punching, shearing, forging or like machines (hereinafter termed the machine) where it is desired to avoid breaking the machine when abnormal stresses occur, for example, if any hard unyielding substance gets between any of the cutting, punching, shearing, forming or like elements used in the machine.

Briefly, the invention consists in providing for use with or in the machine a separate and self contained relief-mechanism or a relief-mechanism partly or wholly incorporated in the body or frame of the machine, which relief-mechanism is provided with a relief-table capable of retroceding and of returning to the initial position from which it began to retrocede.

One object of this invention is to provide a relief-mechanism having such strength and durability that it will withstand the loads or pressures imposed upon it without deteriorating more rapidly than the said machine in which it is placed or incorporated and, to ensure this, large bearing areas are provided on the bearing elements which take or sustain the pressure.

It will be necessary to provide numerous sizes of relief-mechanism, some containing a greater and some a lesser number of edge-pressure-plates or their equivalents, but all embodying the chief features of construction and essential elements of this invention. The invention will now be described and illustrated as applied to a mechanical press of known kind wherein a ram-member has rectilinear reciprocating movement in directions towards and away from the relief-table of the relief-mechanism. It is to be understood however, that the illustrations are given merely by way of example.

In these drawings:

Figure 1 is a part sectional view of a relief-mechanism according to this invention.

Figure 2 is a partial sectional view of a modified construction of relief-mechanism.

Figure 3 is a partial sectional view, on a reduced scale, showing a fluid yielding-device comprised in the invention.

Figure 4 is a partial sectional view of a further modified form of relief-mechanism.

Figure 5 is a view of one end of the mechanism shown in Figure 1 or Figure 2, and Figure 6 is a view of the opposite end thereof.

Figure 7 is an enlarged view of an adjusting-screw comprised in Figure 4.

Figure 8 is a cross-sectional view of the relief-mechanism on the line 8—8 Figure 1.

Figure 9 is a side view, and

Figure 10 an end view of an indicator bar hereinafter referred to.

Like letters of reference refer to like parts throughout the drawings.

A relief table $a$ is supported by or through bearer plates $c$, $c'$ and $f$ and edge pressure plates $d$ and links $q$ (Figure 1) of the character described in U. S. Patent No. 1,473,478, of November 26, 1923, or said relief table $a$ may be supported by or through bearer plates $c$ and $f$, edge pressure plates $d$, links $q$ and anti-friction members such as rollers $e$ (Figure 2) of the character described in U. S. Patent No. 1,622,144, of March 22, 1927.

Resilient means are provided to act upon one end of the bearer plates $f$. In Figures 1 and 2 such means is shown as comprising a compression spring $g$ having one end bearing directly against one end of the bearer plate $f$ and its opposite end bearing against the inner end of a screw $h$ mounted in a casing $u$ carried by one end of the casing. In Figure 3 said resilient means is shown as comprising a pair of cooperating rams $s$ and $t$ working in fluid containers formed as a part of or attached to one end of the casing $j$, the first-named ram member acting directly upon one end of the bearer plate $f$ and a tension spring $t'$ acting on the ram member $t$ through a lever $t^3$. In Figure 4 said resilient means is shown as comprising a tension spring $g^4$ acting indirectly, through a lever $i$ and link $v$, upon one end of the bearer plate $f$. In this embodiment of the invention the spring $g^4$ has one end connected to one end of the lever $i$ and its opposite end connected to one end of a screw $h^4$ extending through the opposite end of the casing. A nut $h^5$ on the opposite end of the screw bears against the outer face of the casing and serves to adjust the tension of the spring $g^4$. The spring $g$, (Figures 1 and 2), or the spring $g^4$, (Figure 4), or the ram members and spring $t'$ associated therewith, (Figure 3), serve to limit the travel of the bearer plates $f$ in one direction. An adjustable stop $l$ is slidably or rotatably mounted in the casing $j$ to engage the opposite end of the bearer plate $f$ and thus limit the movement of said plate in the opposite direction.

According to the embodiment of the invention shown in Figure 1 a table supporting bearer-plate $c$ is attached to, or is formed integral with the inner-face $a'$ of the relief-table $a$ and a second or another so-called base-bearer-plate $c'$ is attached to, or is formed integral with an inner-face $b'$ of its separate box or casing $j$ or equivalent part of the frame of the machine in which it is incorporated.

According to the embodiment of the invention shown in Figure 2 a table-bearer-plate $c$ is attached to, or is formed integral with the inner-face $a'$ of the relief-table $a$ and the inner-face $b'$ of its separate box or casing $j$ or the inner-face of the bottom or other part of the frame $k$ of the machine in which it is incorporated, remote from the relief-table $a$, is formed as a plane-surface and forms a separate roller-bearer-plate $b^2$ to accommodate rollers, balls, or the like $e$, but in all embodiments of the invention a relief-bearer-plate $f$ having a rectilinear or reciprocating movement is employed and said relief-bearer-plate $f$ is provided with two or more transversely disposed and approximately semi-circular-grooves $f'$ on or in one or both faces thereof to accommodate the rounded-ends $d'$ of a plurality of edge-pressure-plates $d$ and with means for attaching links, or the like $q'$. Said relief-bearer-plate $f$, together with the mechanical devices hereinafter described, forms an automatically releasing and retroceding relief-mechanism that will operate at any predetermined pressure imposed on the relief-table $a$ of the relief mechanism.

The mechanical devices which operate in conjunction with the said relief-bearer-plate $f$, and which control it, consist of resilient means, such as a spring $g$ (Figures 1 and 2) or $g^4$ (Figure 4) so arranged as to be capable of exercising a predetermined pressure on one end of the said relief-bearer-plate $f$, after such resilient means has been adjusted to a desired position by the adjusting-screw $h$ (Figures 1 and 2) or $h^4$ (Figure 4) checked by an indicator-rod or bar $p$, which screw has scoring on a plain portion $h'$ thereof.

The other end of the relief-bearer-plate $f$ is formed with an abutment $f^3$ to abut on a stop $l$ slidably-housed in the separate box or casing $j$ of the relief-mechanism, as shown in Figs. 1 and 2, or upon a part or column $k$ of the machine adjacent thereto, as shown in Fig. 4, to which separate box or casing $j$ or column $k$ or the like there is secured a bridge-piece or plate $m$ in which an adjustable and rotatably-mounted screwed-member $n$ is mounted to engage with and impart longitudinal movement to the stop $l$.

Attached to said stop $l$ is a scored-rod $o$ which travels axially therewith. Said rod $o$ passes through the rotatably-mounted screwed-member $n$ whose free end is bevelled so as to permit of easy reading of any of the scored-marks on the said rod $o$ when the stop $l$ is axially moved by a hand-wheel $n'$ mounted on the said screwed-member $n$.

The object of the slidably-housed stop $l$ is to regulate or determine, through the medium of the relief-bearer-plate $f$ and the scored and screwed-rod $o$, the angularity at which it is desired that the edge-pressure-plates $d$ may be held at by said stop $l$ in relation to the plane of the relief-table $a$ of the relief-mechanism, and it is this angularity which determines the pressure at which the said edge-pressure-plates $d$ will be caused to move in a direction to permit the relief-table $a$ to retrocede.

The operation of the relief-mechanism is as follows:—When pressure is applied to the relief-table $a$, it is imparted through the medium of the edge-pressure-plates $d$, the bearer plates $c$, $c'$ and $f$ (Figures 1 and 4) or the bearer plates $c$ and $f$ and anti-friction devices $e$ (Figure 2), to the base $d$ or inner-face $b'$ of the separate box or casing $j$ (or the equivalent therefor if such is constructed to be a part of the frame of a machine in which the relief-mechanism the subject of this invention is employed). When the edge-pressure-plates $d$ are at right angles to the plane of the relief-table $a$, any pressure capable of being delivered to the relief-table $a$ by the machine would not be sufficient to cause the edge-pressure-plates $d$ to make angular movement, for the reason that there would be no component force when said edge-pressure-plates $d$ are at right angles to the plane of the relief-table $a$. Therefore, in order that the relief-table $a$ may operate, the said edge-pressure-plates $d$ must be and are held by the stop $l$ at an angle or inclination other than at right angles to the plane of the relief-table $a$. This position permits them to make angular movement and, at the same time, allows them to impart, when pressure is exerted on the relief-table $a$, a component-force, of which the line of action is parallel to the plane of the relief-table $a$; and this component-force, when controlled by the relief-bearer-plate $f$, is resisted by whatever predetermined resistance the yielding device may have. No movement of the relief table can occur until this predetermined resistance is overcome.

Any pressure existing on or delivered by the relief-table *a* is resolved into a component-force, through the medium of the mechanical devices hereinbefore mentioned, which component-force is easily resisted by the yielding-device because a small resilient energy exerted against one end of the relief-bearer-plate *f* will enable said bearer-plate to resist a great resilient energy existing on or delivered by the relief-table *a* to the bearer-plates *c*, *c'* and *f* or *c* and *f*.

It is therefore obvious that only a small resisting energy need be exerted by the yielding-device to overcome comparatively enormous energy existing or delivered by the relief-table *a* to the said yielding-device.

The mechanical advantage of the parts controlling the movement of the relief-bearer-plate *f* may in some cases be increased by the addition of a linked-lever *i* or the like (Figure 4), which addition is of advantage where a great load or very high pressures exist on, or are delivered to the relief-table *a* and where it is desirable that a small resistance or pressure be exercised by the resilient means.

When a fluid-container, such as shown in Figure 3, is employed for controlling the movement of the relief-bearer-plate *f* a ram or piston *s*, preferably provided with a roller *s'* (Figure 3) is provided which roller contacts with the pressure-receiving end *f²* of the relief-bearer-plate *f*. Pressure is obtained in the fluid-container by a ram *t* of smaller area which is controlled and impelled towards or in to the fluid container by means of the spring *t'* coupled to a screwed-threaded-member *h²* extending through a lever *t³* and having a nut *h* on its free end. The lever *t³* is fulcrumed in such a manner on the frame or body *w* of the fluid-container as to allow said lever *t³* to contact with the outer end of a small ram *t* and so allow said ram to move longitudinally in either direction and also to displace the fluid in the fluid-container and so exert pressure against a larger ram *s* on which a roller *s'* is mounted and cause said larger ram *s* to move through the medium of the fluid in the fluid-container. It is to be understood that the ram-members are of the known kind and therefore no further description is necessary.

The relief-table *a* of the relief-mechanism may, as shown in Figure 8, be provided with T-slots *r* or the like to enable the securing or attaching thereto of any blanking, raising, or forming-dies, punches, shear-blades, croppers, forging, swaging, embossing or other forms of tools or appliances which can be or are ordinarily employed on the ram or bolster of any form of pressure exerting machine.

I claim:

1. An apparatus of the class described, comprising a press table, a frame in which the said table is slidably mounted, a movable bearer-plate, edge pressure plates arranged between the said table and bearer-plate, a resilient member acting on the bearer-plate to move the same in one direction, and an abutment adjustably mounted on the frame to limit the movement of the bearer plate under the action of the said resilient member.

2. An apparatus of the class described, comprising a press table, a frame in which the said table is slidably mounted, a movable bearer plate, a plurality of parallel edge pressure plates arranged between the said table and bearer plate and spaced apart in the direction in which the said bearer plate is movable, a resilient member acting on the bearer plate to move the same in one direction, and an abutment adjustably mounted on the frame to limit the movement of the bearer plate under the action of the said resilient member.

3. An apparatus of the class described, comprising a press table, a frame in which the said table is slidably mounted, a bearer plate movably supported in the frame, edge pressure plates arranged between the said table and bearer plate, a resilient member acting on the bearer plate to move the same in one direction, means for adjusting the tension of said resilient member, an abutment mounted on the frame to limit the movement of the bearer plate by the resilient member, and means for adjusting the position of the said abutment independently of the tension adjusting means.

4. An apparatus of the class described, comprising a press table, a frame in which the said table is slidably mounted, a bearer plate movably supported in the frame, edge pressure plates arranged between the said table and bearer plate, a resilient member acting on the bearer plate to move the same in one direction, and an abutment adjustably held in a fixed position with reference to the frame to limit the movement of the bearer plate.

5. An apparatus of the class described, comprising a press table, a frame in which the said table is slidably mounted, a bearer plate movably supported in the frame, edge pressure plates arranged between the said table and bearer plate, a resilient member acting on the bearer plate to move the same in one direction, means for adjusting the tension of the said member, an indicator associated with said adjusting means; an abutment adjustably held in a fixed position with reference to the frame to limit the movement of the bearer plate and a position indicator associated with the said abutment.

6. An apparatus of the class described, comprising a press-table, a frame in which the said table is slidably mounted, a movable bearer plate, edge pressure plates arranged between the said table and bearer plate, a resilient member acting on the bearer plate to move the same in one direction, means for adjusting the tension of said resilient member, an abutment for said tension adjusting means carried rigidly on the frame, and an abutment adjustably mounted on the frame to limit the movement of the bearer plate under the action of the said resilient member.

FRANK HUMPHRIS.